(12) United States Patent
Korus et al.

(10) Patent No.: US 10,230,723 B2
(45) Date of Patent: Mar. 12, 2019

(54) METHOD AND SYSTEM FOR AUTHENTICATING A SESSION ON A COMMUNICATION DEVICE

(71) Applicant: MOTOROLA SOLUTIONS, INC., Schaumburg, IL (US)

(72) Inventors: Michael F. Korus, Eden Prairie, MN (US); Alejandro G. Blanco, Fort Lauderdale, FL (US); Anthony R. Metke, Naperville, IL (US); George Popovich, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 131 days.

(21) Appl. No.: 15/142,432

(22) Filed: Apr. 29, 2016

(65) Prior Publication Data
US 2017/0318014 A1    Nov. 2, 2017

(51) Int. Cl.
*H04L 29/06* (2006.01)
*G06F 21/32* (2013.01)
*H04W 12/06* (2009.01)

(52) U.S. Cl.
CPC .......... *H04L 63/0861* (2013.01); *G06F 21/32* (2013.01); *H04L 63/105* (2013.01); *H04W 12/06* (2013.01); *G06F 2221/2139* (2013.01)

(58) Field of Classification Search
CPC .... H04L 63/0861; H04W 12/06; G06F 21/31; G06F 21/32
See application file for complete search history.

(56) References Cited

U.S. PATENT DOCUMENTS 8,255,698 B2    8/2012  Li et al.
8,949,619 B2 *  2/2015  Parry .................. H04L 63/0861
                                                713/186
(Continued)

FOREIGN PATENT DOCUMENTS

EP    2743873         6/2014
EP    2743873 A1 *   6/2014   ....... G06Q 20/40145
(Continued)

OTHER PUBLICATIONS

Witte et al., "Context-Aware Mobile Biometric Authentication based on Support Vector Machines" (2013) Fourth International Conference on Emerging Security Technologies, 5 pages.
(Continued)

*Primary Examiner* — Nelson Giddins
(74) *Attorney, Agent, or Firm* — Michael Best & Friedrich LLP (57) ABSTRACT

Method and system for authenticating a session on a communication device. One method includes determining a use context of the communication device and an authentication status of the communication device. The method further includes determining a predetermined period of time based on at least one of the use context and the authentication status. The method further includes generating biometric templates based on at least one of the use context and the authentication status. The method further includes selecting a matching threshold for the biometric templates based on at least one of the use context and the authentication status. The method further includes comparing a match score of each of the biometric templates to the matching threshold to determine a passing amount of biometric templates with match scores that meet or exceed the matching threshold. The method further includes authenticating the session on the communication device.

16 Claims, 5 Drawing Sheets

(56) References Cited

U.S. PATENT DOCUMENTS

| | | | |
|---|---|---|---|
| 9,305,155 B1* | 4/2016 | Vo | G06F 21/32 |
| 9,871,779 B2* | 1/2018 | Sheller | H04L 63/08 |
| 2003/0217276 A1* | 11/2003 | LaCous | G06F 21/32 |
| | | | 713/186 |
| 2006/0206724 A1* | 9/2006 | Schaufele | G06F 21/32 |
| | | | 713/186 |
| 2008/0172729 A1* | 7/2008 | Takamizawa | H04L 63/0861 |
| | | | 726/7 |
| 2010/0162386 A1* | 6/2010 | Li | G06F 21/32 |
| | | | 726/19 |
| 2011/0010558 A1* | 1/2011 | Baldan | G06K 9/00087 |
| | | | 713/186 |
| 2011/0182480 A1* | 7/2011 | Murakami | G06K 9/00885 |
| | | | 382/115 |
| 2011/0302645 A1* | 12/2011 | Headley | H04L 9/3215 |
| | | | 726/7 |
| 2012/0086550 A1* | 4/2012 | LeBlanc | A61B 5/1038 |
| | | | 340/5.82 |
| 2013/0104187 A1* | 4/2013 | Weidner | G06F 21/45 |
| | | | 726/1 |
| 2013/0174239 A1* | 7/2013 | Kim | G06F 21/31 |
| | | | 726/7 |
| 2014/0059675 A1* | 2/2014 | Batie, Jr. | G06F 21/32 |
| | | | 726/19 |
| 2014/0289833 A1* | 9/2014 | Briceno | H04L 63/08 |
| | | | 726/7 |
| 2015/0242605 A1* | 8/2015 | Du | G06F 21/32 |
| | | | 726/7 |
| 2015/0381598 A1* | 12/2015 | Koved | H04L 63/08 |
| | | | 726/3 |
| 2016/0088474 A1* | 3/2016 | Smith | H04W 12/06 |
| | | | 370/310 |
| 2016/0135046 A1* | 5/2016 | John Archibald | H04W 12/06 |
| | | | 455/411 |
| 2016/0142405 A1* | 5/2016 | Deffeyes | H04L 63/0861 |
| | | | 726/7 |
| 2016/0165447 A1* | 6/2016 | Grigg | G06F 21/31 |
| | | | 726/7 |
| 2016/0182503 A1* | 6/2016 | Cheng | H04L 63/0861 |
| | | | 726/7 |
| 2016/0205094 A1* | 7/2016 | Harthattu | H04W 4/02 |
| | | | 455/411 |
| 2017/0041314 A1* | 2/2017 | Shin | H04L 63/0861 |
| 2017/0046508 A1* | 2/2017 | Shin | G06K 9/00892 |
| 2017/0109514 A1* | 4/2017 | Cheng | H04L 63/0861 |
| 2017/0228581 A1* | 8/2017 | Uno | G06K 9/00087 |

FOREIGN PATENT DOCUMENTS

| | | | |
|---|---|---|---|
| EP | 2990999 | 3/2016 | |
| EP | 2990999 A1 * | 3/2016 | G06N 99/005 |

OTHER PUBLICATIONS

Aronowitz et al., "Multi-modal biometrics for mobile authentication," Biometrics (IJCB), 2014 IEEE International Joint Conference on, Clearwater, FL, 2014, pp. 1-8.

PCT/US2017/025499 International Search Report and Written Opinion of the International Searching Authority dated Aug. 2, 2017 (14 pages).

Examination Report from the Intellectual Property Office of Great Britain for Application No. GB1815710.7 dated Dec. 21, 2018 (4 pages).

* cited by examiner

METHOD AND SYSTEM FOR AUTHENTICATING A SESSION ON A COMMUNICATION DEVICE

BACKGROUND OF THE INVENTION

Many communication devices (for example smart telephones, portable radios, smart watches, personal computers, and the like) require a user to authenticate a session on the communication device before allowing the communication device to be used. For example, such authentication may be required by a communication device to prevent unauthorized users from using the communication device. However, when a communication device requires frequent authentication, such authentication may be redundant, difficult, or time-consuming.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of authenticating a session on a communication device. The method includes determining, via an electronic processor, a use context of the communication device. The method further includes determining, via the electronic processor, an authentication status of the communication device based on whether a session on the communication device is authenticated. The method further includes determining, via the electronic processor, a predetermined period of time based on at least one of the group consisting of the use context of the communication device and the authentication status of the communication device. The method further includes generating biometric templates, via a biometric sensor, based on at least one of the group consisting of the use context of the communication device and the authentication status of the communication device. The method further includes selecting, via the electronic processor, a matching threshold based on at least one of the group consisting of the use context of the communication device and the authentication status of the communication device. The method further includes comparing, via the electronic processor, a match score of each of the biometric templates to the matching threshold to determine a passing amount of biometric templates with match scores that meet or exceed the matching threshold. The method further includes authenticating the session on the communication device, via the electronic processor.

Another embodiment provides a communication device including a context sensor configured to indicate a use context of the communication device. The communication device further includes a biometric sensor configured to generate biometric templates. The communication device further includes an electronic processor configured to determine the use context of the communication device based on signals received from the context sensor. The electronic processor is further configured to determine an authentication status of the communication device based on whether a session on the communication device is authenticated. The electronic processor is further configured to determine a predetermined period of time based on at least one of the group consisting of the use context of the communication device and the authentication status of the communication device. The electronic processor is further configured to instruct the biometric sensor to generate biometric templates based on at least one of the group consisting of the use context of the communication device and the authentication status of the communication device. The electronic processor is further configured to select a matching threshold for the biometric templates based on at least one of the group consisting of the use context of the communication device and the authentication status of the communication device. The electronic processor is further configured to compare a match score of each of the biometric templates to the matching threshold to determine a passing amount of biometric templates with match scores that meet or exceed the matching threshold. The electronic processor is further configured to authenticate the session on the communication device.

Figure 1:
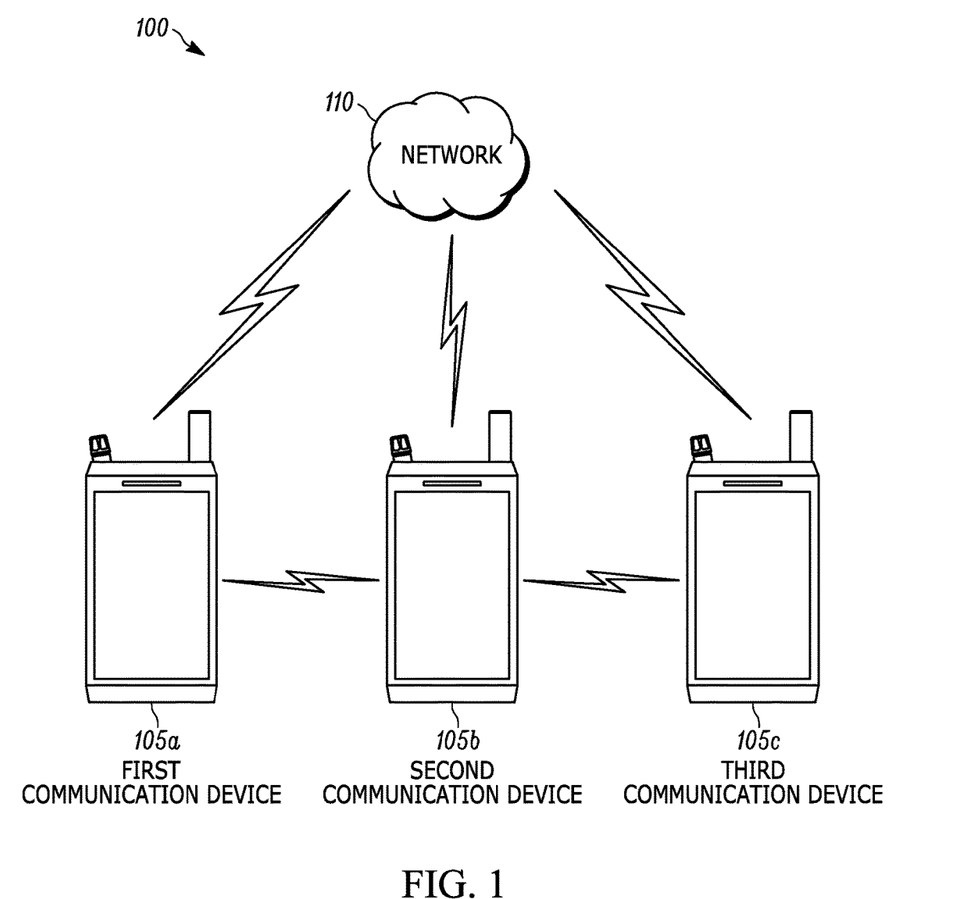
FIG. 1 is a block diagram of a communication system according to one embodiment.

FIG. 1 is a block diagram of a communication system 100 according to one exemplary embodiment. The communication system 100 includes a first communication device 105a, a second communication device 105b, and a third communication device 105c. The communication devices 105a, 105b, and 105c communicate with each other over a network 110. The network 110 may be a wired or a wireless communication network. All or parts of the network 110 may be implemented using various existing networks, for example, a cellular network, the Internet, a land mobile radio (LMR) network, a Bluetooth™ network, a wireless local area network (for example, Wi-Fi), a wireless accessory Personal Area Networks (PAN), a Machine-to-machine (M2M) autonomous network, and a public switched telephone network. The network 110 may also include future developed networks. As illustrated in FIG. 1, in some embodiments, the communication devices 105a, 105b, and 105c may communicate directly with each other using a communication channel or connection that is outside of the network 110. For example, the communication devices 105a, 105b, and 105c may communicate directly with each other when they are within a predetermined distance from each other. Although only three communication devices 105a, 105b, and 105c are illustrated in FIG. 1, additional or fewer communication devices may be included in the communication system 100 and may communicate over the network 110 or outside of the network 110. When describing how a single communication device functions, the description that follows refers to communication device 105. It is not necessary, however, that the communication devices 105a, 105b, and 105c be identical.

The communication device 105 may be a handheld communication device, for example, a mobile telephone or other portable communication device, mobile radio, smart watch or other smart wearable, personal computer, or other communication device configured to communicate over the network 110. In some embodiments, the communication device 105 may be a handheld radio carried by a public safety officer or first responder, such as a police officer.

Figure 2:
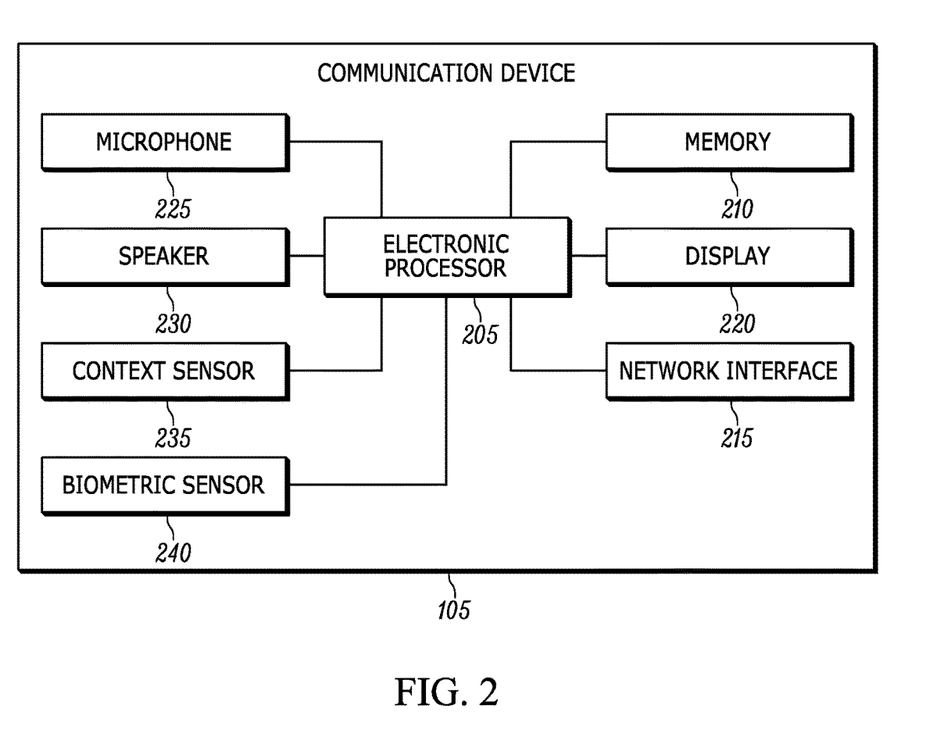
FIG. 2 is a block diagram of a communication device included in the communication system of FIG. 1 according to one embodiment.

FIG. 2 is a block diagram of a communication device 105 of the communication system 100 according to one embodiment. The communication device 105 includes an electronic processor 205 (for example, a microprocessor or another electronic device), a memory 210, a network interface 215, a display 220, a microphone 225, a speaker 230, a context sensor 235, and a biometric sensor 240. In some embodiments, the communication device 105 may include fewer or additional components in configurations different from that illustrated in FIG. 2. For example, in some embodiments, the communication device 105 includes multiple context sensors, biometric sensors, or a combination thereof. Also, the communication device 105 may perform additional functionality than the functionality described below.

The memory 210 includes read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein.

The network interface 215 sends and receives data to and from the network 110. For example, the network interface 215 may include a transceiver for wirelessly communicating with the network 110. Alternatively or in addition, the network interface 215 may include a connector or port for receiving a wired connection to the network 110, such as an Ethernet cable. The electronic processor 205 receives sound signals provided by the microphone 225 and may communicate sound signals over the network 110 through the network interface 215, such as for receipt by another communication device 105. Similarly, the electronic processor 205 may output data received from the network 110 through the network interface 215, such as from another communication device 105, through the speaker 230, the display 220, or a combination thereof.

The context sensor 235 is configured to sense a variety of characteristics being experienced by the communication device 105 or an associated user. The electronic processor 205 uses input signals received from the context sensor 235 to determine a use context of the communication device 105. For example, the context sensor 235 may indicate at least one of the amount of light and the amount of sound in the environment around the communication device 105. In some embodiments, the context sensor 235 may indicate at least one of the temperature and the moisture in the environment around the communication device 105. In some embodiments, when a user is touching or in close proximity to the communication device 105, the context sensor 235 may indicate a heart rate or other physical characteristic of a user of the communication device 105. For example, the context sensor 235 may indicate whether a user is breathing or sweating. In some embodiments, the context sensor 235 may indicate whether a user of the communication device 105 is walking, running, or stationary (in other words, the context sensor 235 may sense the type of movement being experienced by the communication device 105, if any). In some embodiments, the context sensor 235 may indicate the location of the communication device 105. For example, the context sensor 235 may indicate the geographic coordinates of the communication device 105 or whether the communication device 105 is within a predetermined area such as a police station, a police vehicle, or a geo-fence.

Additionally, in some embodiments, the communication device 105 includes additional context sensors 235 to simultaneously monitor at least two characteristics for the electronic processor 205 to use to determine the use context. In some embodiments, one or more context sensors 235 may be located external to the communication device 105. For example, an external context sensor 235 may be associated with a vehicle (for example, a police vehicle) and the communication device 105 may receive information from the external context sensor 235 through the network interface 215.

The biometric sensor 240 is configured to collect biometric data samples from a user of the communication device 105. For example, the biometric sensor 240 may monitor behavioral biometric data that includes at least one of voice data, gait data, gesture data, and the like. Additionally or alternatively, the biometric sensor 240 may monitor physiological data that includes at least one of electroencephalography (EEG) data, electrocardiography (ECG) data, face recognition data, fingerprint recognition data, iris recognition data, and the like. In some embodiments, the biometric sensor 240 may be located on another device external to the communication device 105. For example, the biometric sensor 240 may be located on a bracelet worn by the user that is configured to communicate biometric data to the electronic processor 205 over a wired or wireless connection. In some embodiments, a single sensor (for example, a sensor that collects electrocardiography data) may be used as both the context sensor 235 and the biometric sensor 240. Additionally, in some embodiments, the communication device 105 includes additional biometric sensors 240 to simultaneously collect multiple types of biometric data samples. In some embodiments, the biometric sensor 240 is passive and does not require user action for the biometric sensor 240 to collect a biometric data sample. In some embodiments, the biometric sensor 240 may be external to the communication device 105 and the communication device 105 may receive information from the biometric sensor 240 through the network interface 215. For example, the biometric sensor 240 may be a remote microphone or camera located near the communication device 105 and may sample a user's voice or face, respectively.

Once the biometric sensor 240 collects a biometric data sample, the biometric sensor 240 generates a biometric template from the collected biometric data sample. The electronic processor 205 receives the biometric template from the biometric sensor 240 and executes a biometric matching function as explained below. In alternative embodiments, the electronic processor 205 may receive biometric data samples from the biometric sensor 240. In such embodiments, the electronic processor 205 generates a biometric template from each collected biometric sample and then executes the biometric matching function as explained below. In the below description, references to generating a biometric template include the step of the biometric sensor 240 collecting a biometric data sample unless otherwise noted.

In some embodiments, the biometric sensor 240 collects a number of biometric samples to generate an enrolled biometric template from a user. This enrolled biometric template is stored in the memory 210 for comparison to later-generated biometric templates of the same type. For example, the enrolled biometric template may be generated from multiple training biometric samples requested by the electronic processor 205. The electronic processor 205 may compare later-received biometric templates to the enrolled biometric template to determine whether to authenticate a session on the communication device 105.

In some embodiments, when comparing the later-received biometric templates to the enrolled biometric template, the electronic processor 205 produces a match score that indicates how closely the later-received biometric templates match the enrolled biometric template. The electronic processor 205 then compares the match score to a matching threshold to determine whether to authenticate a session on the communication device 105. For example, when the match scores of the later-received biometric templates are determined to be greater than or equal to the matching threshold (in other words, close enough to the enrolled biometric template), the electronic processor 205 authenticates a session on the communication device 105. On the other hand, when the match scores of the later-received biometric templates are determined to be less than the matching threshold, the electronic processor 205 does not authenticate a session on the communication device 105, which may prevent communication device 105 from being fully operational.

For example, in some embodiments, when a session is not authenticated on the communication device 105, the communication device 105 enters a locked state. In the locked state, the display 220 of the communication device 105 remains in an inaccessible state until a session is authenticated by a biometric template with a match score that meets or exceeds the matching threshold. In alternate embodiments, when a session is not authenticated on the communication device 105, some features of the communication device 105 may be accessible while other features are inaccessible. For example, in such a state, the communication device 105 may allow a user to perform basic functions such as making a telephone call but may prevent the user from accessing certain services on the network 110 such as bank accounts, law enforcement databases, email accounts, and the like.

As noted previously herein, frequent authentication of a communication device may be redundant, difficult, and time-consuming. Additionally, frequent authentication may not be desired in certain situations. For example, when public safety personnel are in an emergency situation such as at a fire incident, a communication device that requires frequent authentication may be burdensome. Similarly, in situations where it is likely that the user of the communication device is the authorized user, frequent authentication may be burdensome. Furthermore, maintaining a constant matching threshold for a variety of different situations may create burdensome authentication in many of those situations. Additionally, different types of authentication methods may be more suitable than others in different situations.

Figure 3A:
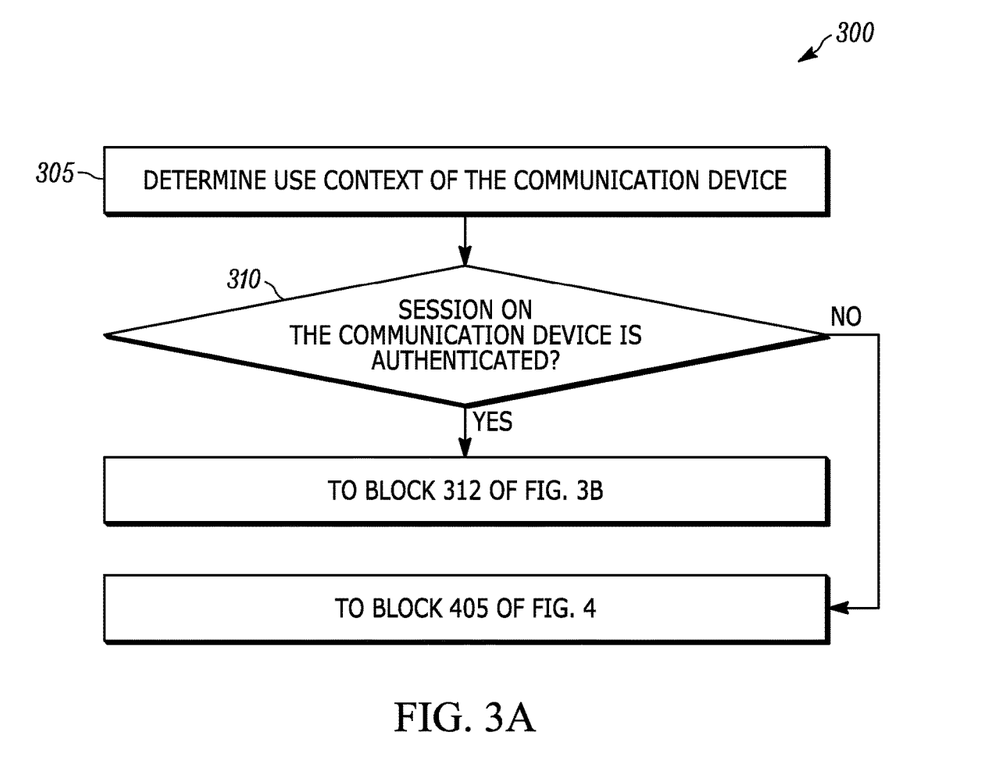
FIGS. 3A and 3B are flowcharts of a method of authenticating a session on the communication device of FIG. 2 performed by the communication device of FIG. 2 according to one embodiment.
Figure 3B:
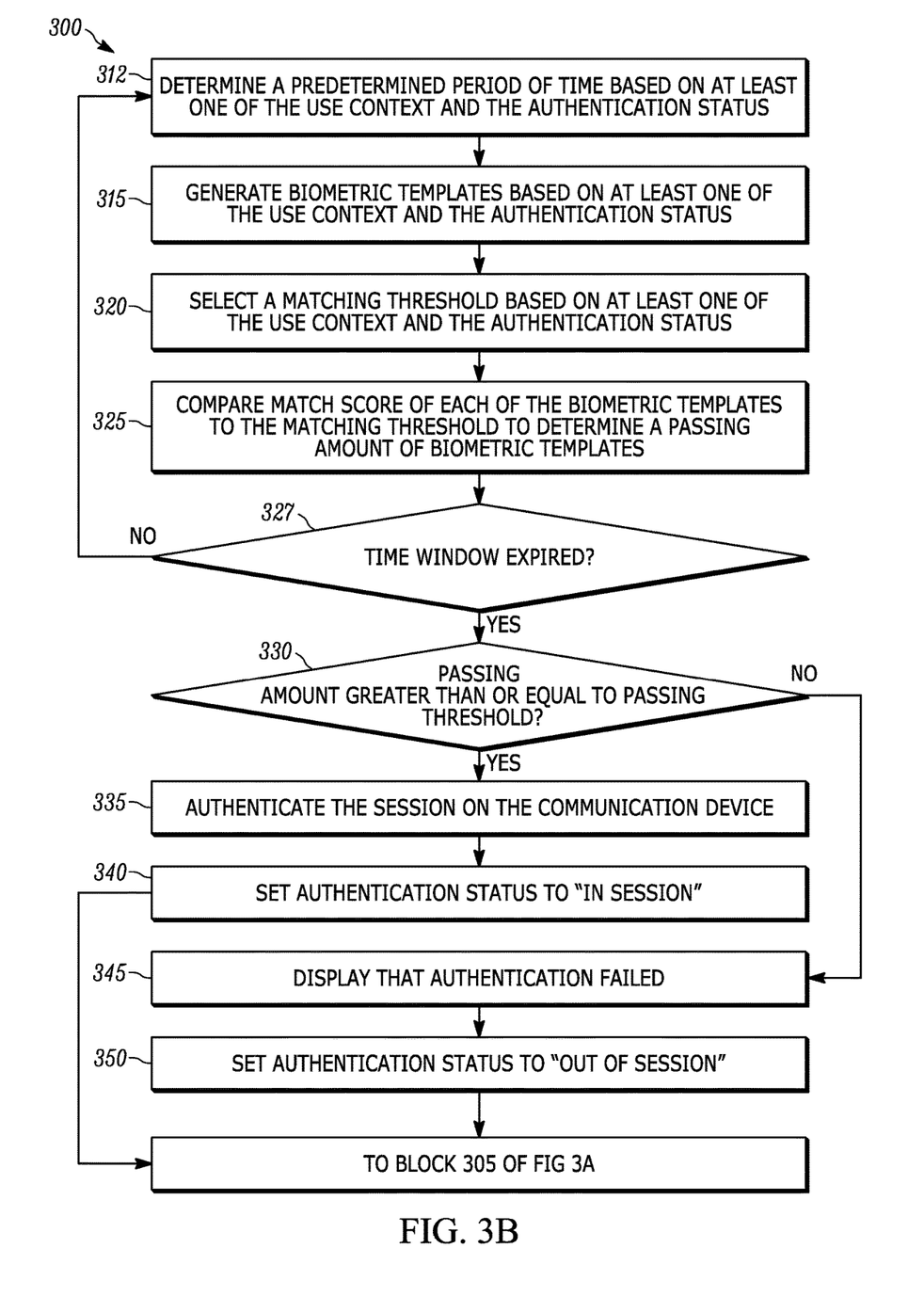
Figure 4:
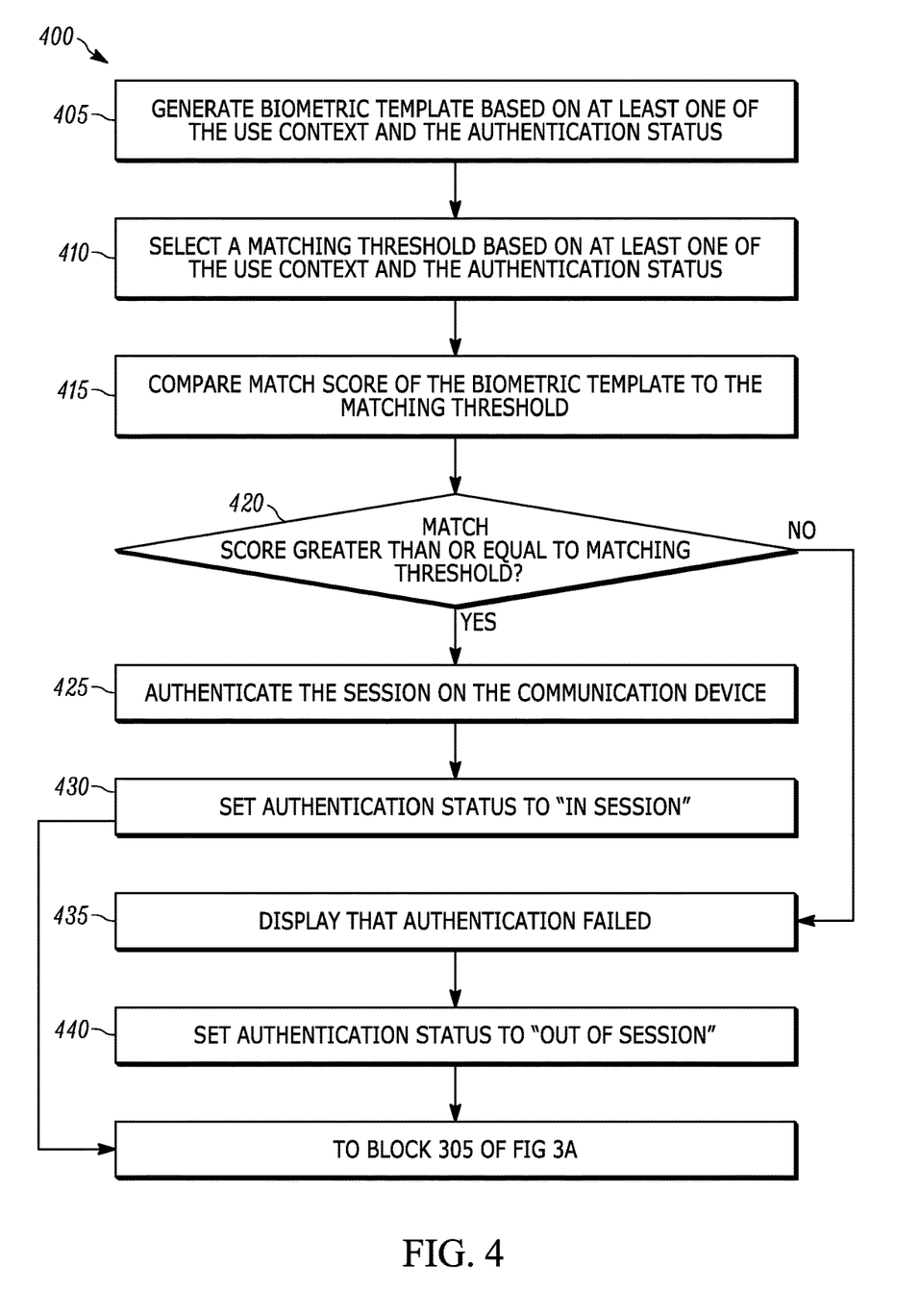
FIG. 4 is a flowchart of a sub-method of the method of FIG. 3A to authenticate a session on the communication device of FIG. 2 performed by the communication device of FIG. 2 according to one embodiment.

Accordingly, to reduce the burden of authenticating a session on a communication device 105, the electronic processor 205 may perform a method 300 illustrated in FIGS. 3A and 3B, which, in some situations, may include a sub-method 400 as illustrated in FIG. 4. The electronic processor 205 may execute the method 300 to provide different authentication parameters depending on at least one of a use context and an authentication status of the communication device 105. For example, the electronic processor 205 may determine a type of biometric data to be used to authenticate the session, a time window over which biometric templates are to be generated, a matching threshold for the match score of the biometric templates for the determined time window, and a passing threshold corresponding to an amount or percentage of biometric templates whose match score must meet or exceed the determined matching threshold within the determined time window. In some embodiments, the method 300 re-authenticates a session that has already been authenticated, which may allow an authorized user to continue using the communication device 105 without having to manually re-authenticate frequently.

As illustrated in FIG. 3A, at block 305, the electronic processor 205 determines a use context of the communication device 105. The electronic processor 205 determines the use context using the context sensor 235 as described previously herein. At block 310, the electronic processor 205 determines an authentication status of the communication device 105 based on whether a session on the communication device 105 is authenticated. For example, the authentication status of the communication device 105 may be selected from the group consisting of "in session" and "out of session." The authentication status of the communication device 105 is "out of session" when a session on the communication device 105 is not authenticated. In such situations, the communication device 105 may not be fully operational as described previously herein. On the other hand, the authentication status of the communication device 105 is "in session" when a session on the communication device 105 is authenticated.

At block 310, when a session on the communication device 105 has not been authenticated (in other words, the communication device 105 is "out of session"), the method 300 proceeds to block 405 of FIG. 4 to execute a different authentication sub-method 400. The sub-method 400 will be explained in greater detail below. When a session on the communication device 105 is authenticated (in other words, the communication device 105 is "in session"), the method 300 proceeds to block 312 of FIG. 3B.

At block 312, the electronic processor 205 determines a predetermined period of time (in other words, a time window) over which the communication device 105 will attempt to re-authenticate the session by monitoring biometric data. The electronic processor 205 determines the time window based on at least one of the use context and the authentication status of the communication device 105. For example, when the authentication status is "in session" and the context sensor 235 indicates that the communication device 105 is located within a predetermined area (for example, within a police station or inside a police vehicle), the electronic processor 205 may determine the time window to be longer than when the context sensor 235 indicates that the communication device 105 is located outside of the predetermined area. A longer time window allows the session on the communication device 105 to continue for a longer period of time before requiring re-authentication. On the other hand, when the authentication status is "out of session" (see sub-method 400 of FIG. 4), the electronic processor 205 may not determine a time window (in other words, the electronic processor 205 may determine the time window to be zero seconds). Instead, a single biometric template from the biometric sensor 240 may be generated and its match score may be compared to a matching threshold (at blocks 405 and 415, respectively, of FIG. 4).

At block 315, the biometric sensor 240 generates biometric templates based on at least one of the use context and the authorization status of the communication device 105. More specifically, the electronic processor 205 determines a type of biometric for the communication device 105 to use to authenticate a session based on at least one of the use context and the authorization status of the communication device 105. For example, when the authentication status is "in session" and the context sensor 235 indicates that a user is walking, the electronic processor 205 may determine that gait data should be monitored by the biometric sensor 240 to re-authenticate the session. In another example, when the authentication status is "in session" and the context sensor 235 indicates that the communication device 105 is located in a quiet environment, the electronic processor 205 may determine that voice data should be monitored by the biometric sensor 240 to re-authenticate the session. In yet another example, when the authentication status is "out of session" (see sub-method 400 of FIG. 4), the electronic processor 205 may determine that fingerprint data should be used to authenticate a session on the communication device 105 (at block 405 of FIG. 4).

At block 320, the electronic processor 205 selects a matching threshold based on at least one of the use context and the authentication status of the communication device 105. For example, when the authentication status is "in session" and the context sensor 235 indicates that a user is moving at a rapid speed (for example, running), the electronic processor 205 may select a matching threshold that is lower than when the context sensor 235 indicates that the user is not moving at a rapid speed. The lower matching threshold allows the session to be re-authenticated more easily (in other words, a lesser match may re-authenticate the session). In another example, when the authentication status is "in session" and the context sensor 235 indicates that the communication device 105 is located within a predetermined area (for example, within a police station or inside a police vehicle), the electronic processor 205 may select a matching threshold that is lower than when the context sensor 235 indicates that the communication device 105 is located outside of the predetermined area. In yet another example, when the authentication status is "out of session" (see sub-method 400 of FIG. 4), the electronic processor 205 may select a matching threshold that is higher than when the authentication status is "in session" (at block 410 of FIG. 4).

During the determined time window, the electronic processor 205 compares each of the biometric templates generated by the biometric sensor 240 to the enrolled biometric template to determine a match score for each of the generated biometric templates. The electronic processor 205 then compares the match score of each generated biometric template to the determined matching threshold to determine a passing amount of biometric templates (at block 325). The electronic processor 205 keeps track of the passing amount of biometric templates with match scores that meet or exceed the matching threshold within the time window.

At block 327, the electronic processor 205 determines whether the time window has expired. When the electronic processor 205 determines that the time window has not expired, the method 300 proceeds back to block 312 to continue to execute blocks 312, 315, 320, and 325 until the time window expires. When the electronic processor 205 determines that the time window has expired, the method 300 proceeds to block 330.

At block 330, the electronic processor 205 compares the passing amount of biometric templates to a passing threshold. The passing threshold is at least one of an amount of biometric templates and a percentage of a total amount of biometric templates generated during the time window. In some embodiments, the electronic processor 205 may require that a predetermined percentage of the generated biometric templates have match scores that meet or exceed the matching threshold. For example, when ten biometric templates were generated during the time window, the electronic processor 205 may require that at least five of the biometric templates have passing match scores. Additionally or alternatively, in some embodiments, the electronic processor 205 may require that a predetermined amount of biometric templates have match scores that meet or exceed the matching threshold. For example, the electronic processor 205 may require that five biometric templates have match scores that meet or exceed the matching threshold regardless of how many biometric templates were generated during the time window.

When the passing amount of biometric templates is greater than or equal to the passing threshold, the electronic processor 205 re-authenticates the session on the communication device 105 (at block 335). At block 340, the electronic processor 205 sets the authentication status to "in session" and the method 300 proceeds back to block 305 of FIG. 3A. Alternatively, at block 330, when the passing amount of biometric templates is less than the passing threshold, the electronic processor 205 controls the display 220 to indicate that authentication of a session has failed (at block 345). Accordingly, the electronic processor 205 does not authenticate a session on the communication device 105. At block 350, the electronic processor 205 sets the authentication status to "out of session" and the method 300 proceeds back to block 305 of FIG. 3A.

In some embodiments, the electronic processor 205 may determine the passing threshold that is necessary to re-authenticate a session on the communication device 105 based on the use context and the authentication status of the communication device 105. Such a determination may be accomplished in a similar manner as described previously herein with respect to determination of the matching threshold. For example, when the authentication status is "in session" and the context sensor 235 indicates that a user is moving at a rapid speed (for example, running), the electronic processor 205 may select a passing threshold that is lower than when the context sensor 235 indicates that a user is not moving at a rapid speed. The lower passing threshold allows the session to be re-authenticated more easily (in other words, a lesser passing threshold may re-authenticate the session).

In some situations, during the determined time window, the use context of the communication device 105 may change. For example, the communication device 105 may be moved from one location to another location. In another example, a user carrying the communication device 105 may begin moving at a rapid speed or may stop moving at a rapid speed. In such situations, the electronic processor 205 may adjust the authentication parameters (for example, at least one of a type of biometric data to be used to authenticate the session, a time window over which biometric templates are to be generated, a matching threshold for the match scores of the biometric templates for the determined time window, and a passing threshold during the determined time window) based on the changes to the use context. For example, as illustrated in FIG. 3B, in some embodiments, the electronic processor 205 may repeat blocks 312, 315, 320, and 325 of the method 300 until the time window has expired.

In some embodiments, at block 315, the electronic processor 205 may control multiple biometric sensors 240 to generate biometric templates within the time window. In such embodiments, at block 320, the electronic processor 205 may select a matching threshold for each type of biometric template. At block 325, the electronic processor 205 may compare the match score of each generated biometric template from each biometric sensor 240 to the corresponding matching threshold.

In some embodiments, the match scores and matching thresholds of the different types of biometric templates are fused together using a weighting system based on the use context and the authentication status of the communication device 105. For example, when a fused match score is generated that relates to both a voice biometric template and a gait biometric template, the fused match score may exceed a fused matching threshold when the match score of the voice biometric template and the gait biometric template individually would not have passed their respective matching threshold. Accordingly, even though neither biometric template would have been indicated to be a passing biometric template on its own, the fused combination of the voice and gait biometric templates indicates a passing biometric template. The weighting system may be used to determine how much weight each type of biometric template should be given when combining the biometric templates to create the fused match score and fused matching threshold. The weighting system may be based on the use context of the communication device 105. For example, when a context sensor 235 indicates that the communication device 105 is located in a loud environment, the electronic processor 205 may give less weight to the voice biometric templates in determining the fused match score and the fused matching threshold.

FIG. 4 illustrates a sub-method 400 of authenticating a session on the communication device 105. As mentioned previously herein, the sub-method 400 is executed by the electronic processor 205 when the electronic processor 205 determines that a session on the communication device 105 has not been authenticated (in other words, the communication device 105 is "out of session") (at block 310 of the method 300). The sub-method 400 is similar to the method 300 in many ways. However, in sub-method 400, the electronic processor 205 compares the match score of a single biometric template to a matching threshold to determine whether to authenticate a session on the communication device 105.

At block 405, the biometric sensor 240 generates a biometric template based on at least one of the use context and the authorization status of the communication device 105. Similar to block 315 of FIG. 3B, the electronic processor 205 determines a type of biometric for the communication device 105 to use to authenticate a session based on at least one of the use context and the authorization status of the communication device 105. For example, when the context sensor 235 indicates that the communication device 105 is located in a quiet environment, the electronic processor 205 may determine that voice data should be monitored by the biometric sensor 240 to authenticate the session. In another example, due to the authentication status being "out of session," the electronic processor 205 may determine that fingerprint data should be used to authenticate a session on the communication device 105.

At block 410, the electronic processor 205 selects a matching threshold based on at least one of the use context and the authentication status of the communication device 105. For example, when the context sensor 235 indicates that a user is moving at a rapid speed (for example, running), the electronic processor 205 may select a matching threshold that is lower than when the context sensor 235 indicates that a user is not moving at a rapid speed. In another example, due to the authentication status being "out of session," the electronic processor 205 may select a matching threshold that is higher than when the authentication status is "in session." In some embodiments, when the authentication status is "out of session," the electronic processor 205 may not lower the matching threshold based on the use context of the communication device 105.

At block 415, the electronic processor 205 compares the match score of the biometric template generated by the biometric sensor 240 to the matching threshold. At block 420, the electronic processor 205 determines whether the match score of the biometric template is greater than or equal to the matching threshold. When the match score of the biometric template is greater than or equal to the matching threshold, the electronic processor 205 authenticates the session on the communication device 105 (at block 425). Accordingly, at block 430, the electronic processor 205 sets the authentication status to "in session" and the method 300 proceeds back to block 305 of FIG. 3A. Alternatively, at block 420, when the match score of the biometric template is less than the matching threshold, the electronic processor 205 controls the display 220 to indicate that authentication of a session has failed (at block 435). Accordingly, the electronic processor 205 does not authenticate a session on the communication device 105. At block 440, the electronic processor 205 sets the authentication status to "out of session" and the method 300 proceeds back to block 305 of FIG. 3A.

In some embodiments, the use context of the communication device 105 may be set by an external device. For example, the communication device 105 may receive information through the network interface 215 from an external device that indicates that the communication device 105 is in an emergency situation (for example, a fire). The communication device 105 may change its use context based on the received signal. Accordingly, the electronic processor 205 may change the authentication parameters of the communication device 105 at at least one of blocks 312, 315, and 320. For example, when the use context of the communication device 105 is determined to be an emergency situation, the electronic processor 205 may perform at least one of lowering the matching threshold, increasing the time window, changing the biometric monitored by the communication device 105, and lowering the passing threshold of passing biometric templates required to authenticate the session.

In some embodiments, the electronic processor 205 may use biometric history to determine the authentication parameters of the communication device 105 (for example, at at least one of blocks 315, 320, 405, and 410). For example, the electronic processor 205 may use biometric history to increase a matching threshold when the matching threshold has been consistently exceeded in a certain use context. Such an increase in matching threshold may reduce the likelihood of an unauthorized user authenticating the communication device 105 without having much effect on an authorized user who historically consistently exceeds the matching threshold in the certain use context.

In some embodiments, the electronic processor 205 may set the matching threshold or the passing threshold based on the presence or absence of a smart badge or other secure device. For example, when the communication device 105 is near a radio-frequency identification (RFID) card that includes an identity token to verify the identity of a user, the electronic processor 205 may lower the matching threshold or the passing threshold. Correspondingly, when the communication device 105 is moved away from the radio-frequency identification card, the electronic processor 205 may increase the matching threshold or the passing threshold. In some embodiments, the secure device may be a bracelet worn by the user that is configured to communicate wirelessly over the network 110.

In some embodiments, the communication device 105 communicates over the network 110 with an identity server. For example, the communication device 105 may communicate with the identity server to indicate that the electronic processor 205 has authenticated a session on the communication device 105. Additionally, the communication device 105 may communicate the authentication parameters that were used to authenticate the session on the communication device 105 to the identity server. In response, the identity server may provide the communication device 105 with an identity token that may be used by the communication device 105 to access application servers over the network 110. In providing the identity token to the communication device 105, the identity server may provide different identity tokens based on the authentication parameters that were used by the communication device 105 to authenticate the session. For example, when the communication device 105 uses a relatively low matching threshold or a relatively low passing threshold, the identity server may provide an identity token with limited access to at least some of the application servers. On the other hand, when the communication device 105 uses a relatively high matching threshold or a relatively high passing threshold, the identity server may provide an identity token that grants greater access to the application servers. Accordingly, access to information by the communication device 105 may be limited depending on the authentication parameters that were used to authenticate the session on the communication device 105.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of authenticating a session on a communication device, the method comprising:
    determining, via an electronic processor, a use context of the communication device;
    determining, via the electronic processor, an authentication status of the communication device, the authentication status indicating whether the session on the communication device is authenticated or not authenticated;
    determining, via the electronic processor, a time window during which a plurality of biometric templates are to be generated to authenticate the session, the determination of the time window being based on at least one of the group consisting of the use context of the communication device and the authentication status of the communication device;
    selecting, via the electronic processor and based on the use context of the communication device, a type of biometric data to be used to authenticate the session;
    generating the plurality of biometric templates of the selected type, via a biometric sensor, during the time window;
    selecting, via the electronic processor, a matching threshold based on the use context of the communication device;
    comparing, via the electronic processor, a match score of each biometric template of the plurality of biometric templates to the matching threshold to determine a passing amount of biometric templates generated during the time window with match scores that meet or exceed the matching threshold; and
    authenticating, via the electronic processor, the session on the communication device based on the passing amount of biometric templates generated during the time window.

2. The method as claimed in claim 1, wherein authenticating the session on the communication device includes authenticating the session on the communication device, via the electronic processor, when the passing amount of biometric templates is greater than or equal to a passing threshold.

3. The method as claimed in claim 2, further comprising determining, via the electronic processor, the passing threshold based on at least one of the group consisting of the use context of the communication device and the authentication status of the communication device.

4. The method as claimed in claim 1, further comprising:
    determining, via the electronic processor, a second use context of the communication device during the time window, the second use context being different than the first use context;
    generating a second plurality of biometric templates, via a second biometric sensor, based on the second use context of the communication device during the time window;
    selecting, via the electronic processor, a second matching threshold for the second plurality of biometric templates based on the second use context of the communication device; and
    comparing, via the electronic processor, a match score of each biometric template of the second plurality of biometric templates to the second matching threshold to determine a second passing amount of biometric templates generated during the time window with match scores that meet or exceed the second matching threshold;
    wherein authenticating the session on the communication device includes authenticating the session on the communication device, via the electronic processor, when the second passing amount of biometric templates is greater than or equal to a passing threshold.

5. The method as claimed in claim 1, further comprising:
    generating a second plurality of biometric templates, via a second biometric sensor, during the time window based on at least one of the group consisting of the use context of the communication device and the authentication status of the communication device, the second plurality of biometric templates being of a different type than the first plurality of biometric templates;
    selecting, via the electronic processor, a second matching threshold for the second plurality of biometric templates based on at least one of the group consisting of the use context of the communication device and the authentication status of the communication device;
    fusing, via the electronic processor, a match score of each biometric template of the second plurality of biometric templates with the match score of each biometric template of the first plurality of biometric templates to generate fused match scores;
    fusing, via the electronic processor, the first matching threshold and the second matching threshold to generate a fused matching threshold; and
    comparing, via the electronic processor, each of the fused match scores to the fused matching threshold to determine a passing amount of fused biometric templates generated during the time window with fused match scores that meet or exceed the fused matching threshold;
    wherein authenticating the session on the communication device includes authenticating the session on the communication device, via the electronic processor, when the passing amount of fused biometric templates is greater than or equal to a passing threshold.

6. The method as claimed in claim 5, further comprising determining, via the electronic processor, the passing threshold based on at least one of the group consisting of the use context of the communication device and the authentication status of the communication device.

7. The method as claimed in claim 1, further comprising receiving, via a network interface, information relating to the use context of the communication device.

8. The method as claimed in claim 2, further comprising receiving, via a network interface, an identity token when the session is authenticated on the communication device, the identity token being based on at least one of the group consisting of the matching threshold and the passing threshold.

9. A communication device comprising:
    a context sensor configured to indicate a use context of the communication device;
    a biometric sensor configured to generate biometric templates; and
    an electronic processor configured to
        determine the use context of the communication device based on signals received from the context sensor;

determine an authentication status of the communication device, wherein the authentication status indicates whether a session on the communication device is authenticated or not authenticated;

determine a time window during which a plurality of biometric templates are to be generated to authenticate the session, the determination of the time window being based on at least one of the group consisting of the use context of the communication device and the authentication status of the communication device;

select, based on the use context of the communication device, a type of biometric data to be used to authenticate the session;

instruct the biometric sensor to generate the plurality of biometric templates of the selected type during the time window;

select a matching threshold for the biometric templates based on the use context of the communication device;

compare a match score of each biometric template of the plurality of biometric templates to the matching threshold to determine a passing amount of biometric templates generated during the time window with match scores that meet or exceed the matching threshold; and authenticate the session on the communication device based on the passing amount of biometric templates generated during the time window.

10. The communication device of claim 9, wherein the electronic processor is configured to authenticate the session on the communication device when the passing amount of biometric templates is greater than or equal to a passing threshold.

11. The communication device of claim 10, wherein the electronic processor is further configured to determine the passing threshold based on at least one of the group consisting of the use context of the communication device and the authentication status of the communication device.

12. The communication device of claim 9, further comprising a second biometric sensor configured to generate a second plurality of biometric templates, wherein the electronic processor is further configured to determine a second use context of the communication device during the time window, the second use context being different than the first use context;

instruct the second biometric sensor to generate the second plurality of biometric templates during the time window based on the second use context of the communication device;

select a second matching threshold for the second plurality of biometric templates based on the second use context of the communication device;

compare a match score of each biometric template of the second plurality of biometric templates to the second matching threshold to determine a second passing amount of biometric templates generated during the time window with match scores that meet or exceed the second matching threshold; and authenticate the session on the communication device, via the electronic processor, when the second passing amount of biometric templates is greater than or equal to a passing threshold.

13. The communication device of claim 9, further comprising a second biometric sensor configured to generate a second plurality of biometric templates, the second plurality of biometric templates being of a different type than the first plurality of biometric templates, wherein the electronic processor is further configured to instruct the second biometric sensor to generate the second plurality of biometric templates during the time window based on at least one of the group consisting of the use context of the communication device and the authentication status of the communication device;

select a second matching threshold for the second plurality of biometric templates based on at least one of the group consisting of the use context of the communication device and the authentication status of the communication device;

fuse a match score of each biometric template of the second plurality of biometric templates with the match score of each biometric template of the first plurality of biometric templates to generate fused match scores;

fuse the first matching threshold and the second matching threshold to generate a fused matching threshold;

compare each of the fused match scores to the fused matching threshold to determine a passing amount of fused biometric templates generated during the time window with fused match scores that meet or exceed the fused matching threshold; and authenticate the session on the communication device when the passing amount of fused biometric templates is greater than or equal to a passing threshold.

14. The communication device of claim 13, wherein the electronic processor is further configured to determine the passing threshold based on at least one of the group consisting of the use context of the communication device and the authentication status of the communication device.

15. The communication device of claim 9, further comprising a network interface configured to receive information relating to the use context of the communication device.

16. The communication device of claim 10, further comprising a network interface configured to receive an identity token when the session is authenticated on the communication device, wherein the identity token is based on at least one of the group consisting of the matching threshold and the passing threshold.

* * * * *